United States Patent
Kameyama et al.

[11] Patent Number: 6,019,254
[45] Date of Patent: Feb. 1, 2000

[54] BEVERAGE SUPPLY APPARATUS

[75] Inventors: Bunichiro Kameyama; Noboru Chigira; Souichi Matsuzoe, all of Osaka, Japan

[73] Assignee: Sanyo Electric Co., Ltd., Osaka-fu, Japan

[21] Appl. No.: 09/159,082

[22] Filed: Sep. 23, 1998

[30] Foreign Application Priority Data

Sep. 24, 1997 [JP] Japan ..................... 9-258978

[51] Int. Cl.⁷ ........................... B67D 5/50
[52] U.S. Cl. ................... 222/129.1; 222/146.6; 222/159; 62/389; 138/145
[58] Field of Search ............... 138/145; 62/389, 62/390; 222/146.6, 159, 129.1, 129.3, 129.4

[56] References Cited

U.S. PATENT DOCUMENTS

| | | | |
|---|---|---|---|
| 4,592,490 | 6/1986 | McMichael | 222/129.1 |
| 4,784,310 | 11/1988 | Credle, Jr. et al. | 222/129.1 |
| 4,801,048 | 1/1989 | Credle, Jr. et al. | 222/129.1 |
| 5,323,691 | 6/1994 | Reese et al. | 99/275 |
| 5,556,006 | 9/1996 | Sano | 222/129.1 |
| 5,647,512 | 7/1997 | Assis Mascarenhas De Oliveria et al. | 222/146.6 X |

FOREIGN PATENT DOCUMENTS 2-169992  6/1990  Japan .

*Primary Examiner*—Kenneth Bomberg
*Attorney, Agent, or Firm*—Sughrue, Mion, Zinn Macpeak & Seas, PLLC

[57] ABSTRACT

A coiled tube for cooling water or thick juice has an inner layer for preventing minerals such as Ca, Mg, etc. from depositing thereon, and a water or thick juice tube has an inner layer for preventing minerals such as Ca, Mg, etc. from depositing thereon on the side of the down-stream of the coiled tube.

20 Claims, 1 Drawing Sheet

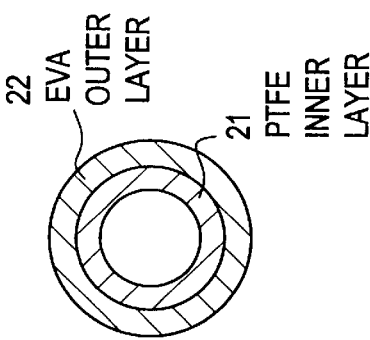
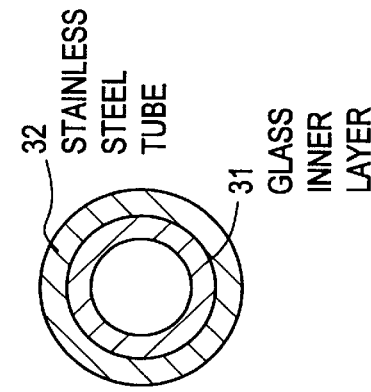
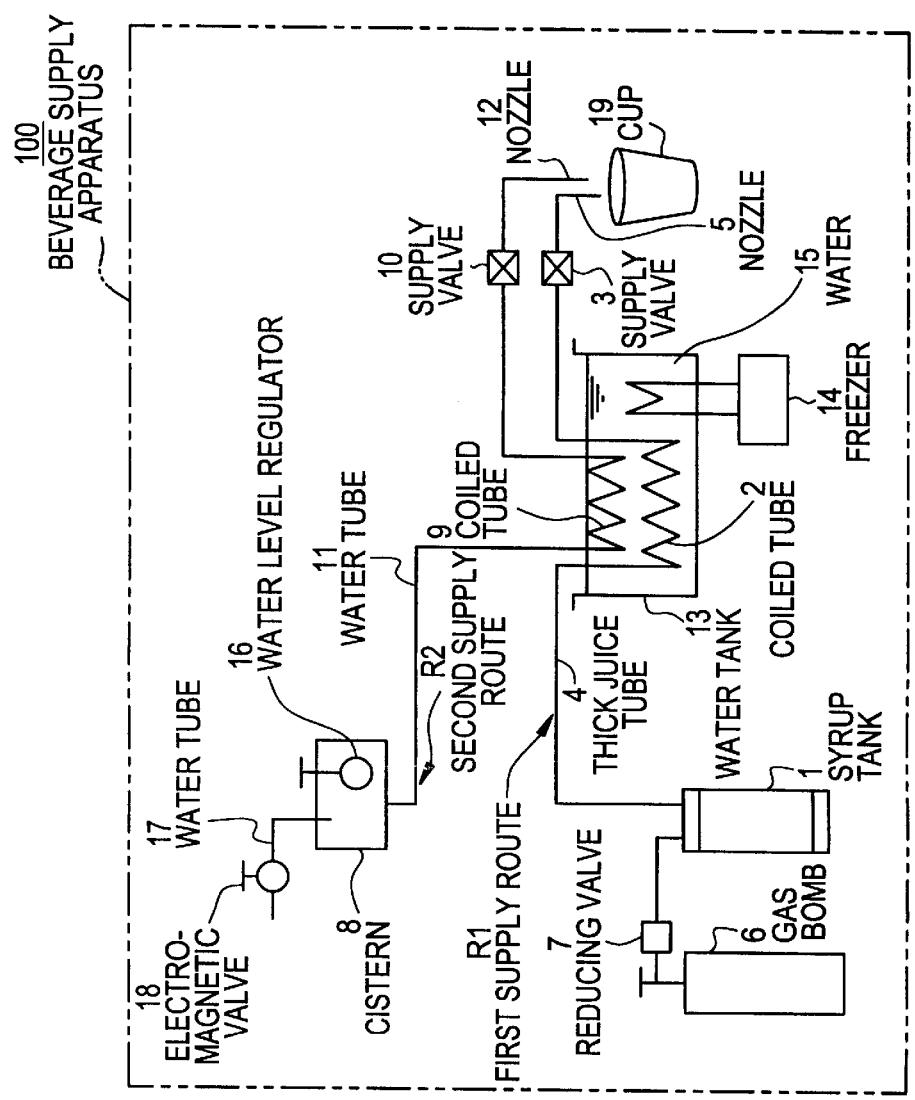

BEVERAGE SUPPLY APPARATUS

FIELD OF THE INVENTION

The invention relates to a beverage supply apparatus, and more particularly to, an apparatus which is called an automatic beverage vending machine, a beverage dispenser, etc. for providing beverage such as juice, coffee, tea, beer, etc.

BACKGROUND OF THE INVENTION

Here, a conventional juice dispenser is briefly explained as one of examples for a conventional beverage supply apparatus. The conventional juice dispenser comprises a syrup tank for containing thick juice, a cistern for containing water to dilute the thick juice, a thick juice nozzle for spouting the thick juice to a cup, a water nozzle for spouting the water to the cup, a thick juice tube of a plastic synthetic resin having the thick juice nozzle at one end thereof and connected to the syrup tank at an opposite end thereof, a water tube of a plastic synthetic resin having the water nozzle at one end thereof and connected to the cistern at an opposite end thereof, a coiled thick juice tube of stainless steel interposed at an appropriate position of the thick juice tube, a coiled water tube of stainless steel interposed at an appropriate position of the water tube, a cooling water tank for immersing the coiled thick juice and water tubes to cool the thick juice and the water flowing through the coiled thick juice and water tubes, and supply valves for controlling the thick juice and water nozzles to spout the thick juice and the water to the cup.

In operation, when the supply valves are opened, thick Juice and water supplied, respectively, from the syrup tank and the cistern are spouted from the nozzles to the cup. The spouted thick juice and water which have been cooled in passing through the coiled thick juice and water tubes are well mixed in the cup, so that a cup of juice which is adequately cooled it prepared.

In the conventional juice dispenser, the inner surfaces of the thick juice and water tubes including the coiled thick juice and water tubes are periodically (for instance, once a week) cleaned by inserting a cleaning member such as a string having a sponge like material on the outer surfaces thereof into the insides of the thick juice and water tubes which are emptied by draining the thick juice and the water from the thick juice and water tubes. This cleaning prevents funguses from breeding on the inner surfaces of the thick juice and water tubes.

In the conventional juice dispenser, however, there are disadvantages in that the thick juice is wasted to increase the cost of juice, because the thick juice is drained at each time of cleaning the thick juice and water tubes, and that the cleaning operation is troublesome, because it must be periodically carried out by draining the thick juice and the water and inserting the cleaning member into the thick juice and water tubes.

In order to eliminate the necessity of cleaning a beverage liquid-cooling tube the Japanese Patent Kokai No. 2-169992 has proposed a heat-exchanging apparatus for beverage supply in which the beverage liquid-cooling tube is made of fluorine resin or polyethylene to avoid the attachment of scale to the inner surface thereof.

The inventor has found in his experiment, however, that the use of a beverage liquid-cooling tube which is made of fluorine resin or polyethylene is insufficient to eliminate the cleaning thereof, because beverage liquid precipitates inorganic minerals such as Ca, Mg, etc. in accordance with the lowering of the solubility thereof, when it is cooled therein, and that such precipitated inorganic minerals are deposited on the inner surface of a beverage liquid tube on the side of the down-stream of the beverage liquid-cooling tube.

SUMMARY OF THE INVENTION

Accordingly, it is an object of the invention to provide a beverage supply apparatus in which beverage liquid is not or less wasted.

It is another object of the invention to provide a beverage supply apparatus for which the number of cleaning the beverage liquid and/or water tubes is decreased, or no cleaning process is necessary.

According to the invention, a beverage supply apparatus, comprises: a tank for containing beverage liquid; a nozzle for spouting the beverage liquid to a cup; a beverage liquid tube having the nozzle at one end thereof and connected to the tank at an opposite end thereof; a cooling tube interposed at an appropriate position of the beverage liquid tube; a cooling medium for immersing the cooling tube, and a supply valve for controlling the nozzle to spout the beverage liquid to the cup; wherein the cooling tube has an inner layer for preventing inorganic minerals such as Ca, Mg, etc. from depositing thereon; and the beverage liquid tube has an inner layer for preventing the inorganic minerals from depositing thereon on the side of a down-stream of the cooling tube.

The invention is based on the inventor's experimental confirmation as explained below.

When water is supplied from a cistern through a water tube to a coiled water tube of stainless steel which is immersed in a cooling water tank, the water is cooled in the coiled water tube, so that the solubility of the water is lowered, and the inorganic minerals are precipitated form the cooled water to be deposited on the inner surface of the coiled water tube and the inner surface of the water tube on the side of the down-stream of the coiled water tube. Once the inorganic minerals are deposited on the inner surface of the coiled water tube and the inner surface of the water tube on the side of the down-stream of the coiled water tube, funguses contained in the water are bedded on the inorganic mineral-deposited layer to breed thereon This means that the breeding of funguses is avoided by preventing the inorganic minerals from depositing on the inner surface of the coiled water tube and the inner surface of the water tube on the side of the down-stream of the coiled water tube, because the precipitation of inorganic minerals such as Ca, Mg, etc., its remarkably found in the coiled water tube in accordance with the lowering of the solubility of the water therein.

As a matter of course, the water tube between the cistern and the coiled water tube may be provided with an inner layer for preventing inorganic minerals such as Ca, Mg, etc. from depositing thereon to enhance the suppression of the breeding of funguses.

This can be also applied to a coiled beverage liquid tube for cooling beverage liquid such as beer, thick juice, thick coffee, thick tea, etc., and a beverage liquid tube for flowing the beverage liquid.

BRIEF DESCRIPTION OF THE DRAWINGS

The invention will be explained in more detail in conjunction with appended drawings, wherein:

FIG. 1 is an explanatory diagram showing a beverage supply apparatus in a preferred embodiment according to the invention;

FIG. 2 is a cross-sectional view showing a water or thick juice tube used in the preferred embodiment; and FIG. 3 is a cross-sectional view showing a coiled tube used in the preferred embodiment.

PREFERRED EMBODIMENTS OF THE INVENTION

A preferred embodiment of beverage supply apparatus according to the invention will be described in more detail in conjunction with FIG. 1.

FIG. 1 shows beverage supply apparatus 100 adapted for a juice vending apparatus of post-mixing type. Syrup tank 1 is made of stainless steel and filled with syrup (not shown) for preparing juice which is to be sold by beverage supply apparatus 100 Syrup tank 1 is connected with nozzle 5 through thick juice tube 4 intervened by coiled tube 2 for cooling and supply valve 3.

Gas bomb 6 charged with carbon dioxide gas is connected with syrup tank 1 through reducing valve 7. The syrup in syrup tank 1 is supplied to thick juice tube 4 by the pressure of carbon dioxide gas from gas bomb 6 applied on the surface of syrup.

Cistern 8 stores an appropriate volume of tap water for diluting the thick juice supplied from syrup tank 1 to a predetermined concentration. Cistern 8 is connected with nozzle 12 through water tube 11 intervened by coiled tube 9 for cooling and supply valve 10.

Coiled tubes 2 and 9 for cooling the thick juice therein are located within water tank 13 so as to be cooled by water 15 in water tank 13 water 15 is cooled to a predetermined temperature by means of freezer 14.

Cistern 8 is provided with water level regulator 16 for detecting the level of water therein in order to maintain a predetermined level of the water. Water level regulator 16 is so arranged, in cooperation with electromagnetic valve 18 attached to water tube 17, that electromagnetic valve 18 is opened when the level of water in cistern 8 detected by water level regulator 16 is below the predetermined level and the valve is closed when the water level is above the predetermined level.

Cup 19 is made of, for example, paper and placed under the outlet of nozzles 5 and 12 by means of a well known system, not shown, after being expelled from a cup storage portion and transported there when coin(s) of a predetermined amount is supplied and one of the article selection keys, not shown, is operated.

The thick juice supplied from syrup tank 1 through thick juice tube 4, coiled tube 2 and supply valve 3 to nozzle 5 and the water supplied from cistern 8 through water tube 11, coiled tube 9 and supply valve 10 to nozzle 12 are poured into cup 19 placed under nozzles 5 and 12.

In beverage supply apparatus 100 in FIG. 1, the inner surface of either the first supply route R1 from the outlet of syrup tank 1 to the outlet of nozzle 5 or the second supply route R2 from the outlet of cistern 8 to the outlet of nozzle 12 is made of water repellent material.

FIG. 2 shows a cross-sectional view of a composite tube adapted for the thick juice tubes in the beverage supply apparatus of FIG. 1. Either tube 4 or tube 11 may be a composite tube of two synthetic resins which consists of an inner layer of water repellent fluorocarbon resin, for example, poly(tetrafluoroethylene) (PTFE) and an outer layer of transparent resin, for example, ethylene/vinylacetate copolymer(EVA), as shown in FIG. 2. In the composite tube shown in FIG. 2, PTFE inner layer 21 having an inner diameter of 5 mm and a thickness of 0.2 mm is covered with EVA outer layer 22. Thus, the inside of the composite tube can be visualized from outside and is improved in strength so as to tolerate some handling in installation because of the flexibility superior to a simple PTFE tube.

FIG. 3 shows a cross-sectional view of a tube adapted for coiled tubes for cooling in the preferred embodiment. Coiled tubes 2 and 9 for cooling may be composed of stainless steel tube 32 having thermal conductivity higher than resins so as to facilitate heat exchange through the tube with water 15 in water tank cooled by freezer 14, inner surface thereof being coated with a glass inner layer 31 of a water-repellent glass material, for example, essentially composed of tetraethoxysilan formed by sol/gel process. A coiled tube for cooling as shown in FIG. 3 consists of stainless steel tube 32 and glass inner layer 31 having thickness of, for example, 100 nm.

In more detail, for preparing coiled tubes 2 and 9, a stainless steel tube of a predetermined diameter is formed in a coil, the coil is dipped in a sol of glass such as tetraethoxysilan, the inside of the tube is wet with the sol by applying vacuum to one end and, then, the sol is dried and heated to be transformed to gel, thereby the inner layer of the tube is made water-repellent.

The water-repellent layer formed inside the steel tube by sol/gel process has preferably a thickness of from 10 to 1000 nm for obtaining sufficient water-repellency and for freedom from cracking and stripping off. If the thickness is less than 10 nm, water-repellency is insufficient, while cracking and stripping off tend to occur due to the difference in thermal expansion from the substrate if the thickness is above 1000 nm.

Coiled tube 2 and 9 may be of synthetic resin. In more detail, the coiled tubes may be formed of some resin having higher mechanical strength and excellent water-repellency mixed with an appropriate amount of filler material of high thermal conductivity so as to improve thermal conduction, and the inside of the tube is coated with some water-repellent material.

For instance, a tube of highly thermal conductive resin having water-repellent inner surface adapted for cooling coil may be prepared by covering an outer surface of a flourocarbon resin pipe composed of a film of 0.1 to 0.2 mm in thickness with nylon resin or the like containing graphite or carbon fiber which provides the tube with high thermal conductivity in accordance with the use of a method such as extrusion.

The resin-coiled tube is disposable after the use of a predetermined time period, thereby eliminating the necessity of cleaning the inside thereof, because the manufacturing cost thereof is much lower than the metal-coiled tube, even though a coiled tube of synthetic resin thus manufactured by extrusion, etc. is longer for the purpose of cooling water and thick juice than a coiled tube of metal due to the difference in thermal conductivities. Therefore, the total costs of the maintenance for the resin-coiled tube are largely reduced as compared to those of the metal-coiled tube.

Supply valves 3 and 10 which can be operated automatically are made of stainless steel and their inner surface forming the routes for syrup and water to pass are made water-repellent by the sol/gel process similar to that used for coiled tubes 2 and 9.

Nozzles 5 and 12 are formed of composite resin consisting of an appropriate engineering plastic such as poly (phenylene-sulfide) resin (PPs) containing a necessary amount of whiskers of flourocarbon resin which is water-repellent, whereby both outer and inner surfaces are made water-repellent.

Tubes and components are connected by parts such as nipples, not shown, made water-repellent by the sol/gel process mentioned above.

In beverage supply apparatus 100 according to the invention, the inner surface of thick juice tube 4 is water-repellent. Thus, even if some air is introduced into thick juice tube 4, upon renewal of syrup tank 1, from the open end of the tube released from syrup tank 1, so that some bacteria in the air are introduced in syrup in the tube, the syrup flows through thick juice tube 4 toward nozzle 5 like an ideal fluid without adhering to and residing on the inner surface of the water-repellent tube, being driven by syrup supplied successively from syrup tank 1 with gas pressure.

Therefore, bacteria are prevented from breeding within thick juice tube 4 not only when it is filled with a juice such as concentrated orange juice having pH of around 3 and high content of sugar enough to inhibit growth of bacteria, but also even if it is filled with syrups for tea beverage such as oolong tea and black tea in which bacteria breed readily because they are neutral and low in sugar content.

When water supplied into a coiled tube for cooling is cooled on the inner surface of the tube, mineral contents such as Ca and Mg dissolved in the water readily deposit on the surface, causing a problem in a conventional beverage supply apparatus. Coiled tube 9 for cooling having water-repellent inner surface in beverage supply apparatus 100, according to the invention, prohibits mineral deposits to adhere thereto and allows them to flow out with the running water, whereby no visible mineral deposit is left on the inner surface of the coiled tube.

Deposits on the inner surface of either nozzle 5 or nozzle 12 are reduced by the same reason This results in inhibition of breeding of bacteria on the surface because it is dried up in a short period owing to water-repellency of the surface which reduces contamination on the surface. Further, there is an advantage of the ease of wiping off the syrup when it attaches to the outer surface of the nozzle.

The syrup may be supplied from the factory in a batch of syrup tank 1 used also as a container or may be supplied by separate containers so as to be poured into an inlet, not shown, provided on syrup tank 1.

Various modifications are available as far as they are within the aspects of invention described in the claims as the invention is not to be limited to the preferred embodiment as described above.

For example, cistern 8, coiled tube 9, supply valve 10, nozzle 12 and electromagnetic valve 16, constituting the second supply route R2, may be omitted from beverage supply apparatus 100 shown in FIG. 1, in case where a pre-mix article such as beer which requires no dilution on demand are sold in the apparatus.

Thermal processing portion including coiled tube 2, water tank 13, freezer 14 and water 15 and supply system for cup 19 are not necessary for beverage supply apparatus 100 as shown in FIG. 1, in case where syrup tank 1 is filled with cold raw beer so that a waiter may pour the beer from nozzle 5 into a jug in his hand. Further, if freezer 14 is replaced by a heating means, hot beverages can be supplied from the nozzle.

Either tube 4 or tube 11 may be composed of a metal tube, for example, stainless steel tube, the inner surface of which is made water-repellent by the sol/gel process. Tubes 4 and 11 either may be connected with other portions by connecting parts composed of the water-repellent composite resin used for nozzles 5 and 12.

Nozzles 5 and 12 may be formed of water-repellent fluorocarbon resin on the inner surface and some engineering plastic provided on the outside, or may be formed of a metal, the inner surface of which is made water-repellent by the sol/gel process described above. Nozzles 5 and 12 may be combined so that the content from syrup tank 1 and that from cistern 8 are supplied to and ejected from one nozzle.

Further, the inner surface of cistern 8 may be water-repellent by resin coating or the sol/gel process mentioned above.

The sol used in the sol/gel process for water-repellent treatment or the water-repellent composite resin for forming nozzles 5 and 12 and so on may be composed of or may contain an antibiotic material, for example, silver-containing zeollite dispersed therein, in order to prohibit breeding of bacteria on the surface.

Because the inner surface of the supply route in a beverage supply apparatus according to the invention is formed of a water-repellent material as described in the foregoing, a liquid, including the beverage to be supplied and raw material thereof, never adhere to and remain on the inner surface which is water-repellent. Thus, even if renewal of a container for the liquid or other operation causes introduction of air into the supply route from an open end thereof released temporarily and some bacteria in the air to be left in the liquid within the route, the inside of the route is prevented from contamination by the bacteria because the liquid is transported through the route like an ideal fluid without adhering to the inner surface of the route, being driven by the liquid supplied successively from its source toward a nozzle at the end of the route.

Particularly, in a beverage supply apparatus according to the invention in which the inner surface of coiled metal tube for cooling or other parts is made water-repellent by sol/gel process, no visible deposition of mineral substances is allowed even if, for example, water supplied into the coiled tube and cooled on the inner surface of the tube causes mineral contents such as Ca and Mg dissolved in the water to deposit on the surface more readily than at the room temperature, because the water-repellent surface prohibits mineral deposits to adhere thereto and allows them to flow out with the running water.

Further, with regard to a beverage supply apparatus according to the invention in which the thermal processing portion is formed of a resin tube having higher thermal conductivity, mineral contents including Ca and Mg dissolved in water are inhibited from deposition on the inner surface thereof, similar to the metal tubes mentioned above. The costs in manufacturing of a resin tube is much lower compared with a metal tube. The resin-coiled tube is disposable after the use of a predetermined time period, thereby eliminating the necessity of cleaning the inside thereof, because the manufacturing coat thereof is much lower than the metal-coiled tube, even though a coiled tube of synthetic resin thus manufactured by extrusion, etc. is longer for the purpose of cooling water and thick juice than a coiled tube of metal due to the difference in thermal conductivities. Therefore, the total costs of the maintenance for the resin-coiled tube are largely reduced as compared to those of the metal-coiled tube.

Thus, according to the invention, a beverage supply apparatus which is improved in the sanitary condition can be provided and, in addition, the costs for maintenance can be reduced owing to reduction in the frequency of cleaning.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meats and bounds of the claims, or equivalence of such meets and bounds are therefore intended to be embraced by the claims.

What is claimed is:

1. A beverage supply apparatus, comprising:

a tank for containing beverage liquid;

a nozzle for spouting said beverage liquid to a cup;

a beverage liquid tube having said nozzle at one end thereof and connected to said tank at an opposite end thereof;

a cooling tube interposed at an appropriate position of said beverage liquid tube;

a cooling medium for immersing said cooling tube therein; and a supply valve for controlling said nozzle to spout said beverage liquid to said cup;

wherein said cooling tube has an inner layer for preventing inorganic minerals such as Ca, Mg, etc. from depositing thereon, and said beverage liquid tube has an inner layer for preventing said inorganic minerals from depositing thereon on a side of a down-stream of said cooling tube.

2. The apparatus as defined in claim 1, wherein:

said beverage liquid tube has an inner layer for preventing said inorganic minerals from depositing thereon on a side of an up-stream of said cooling tube.

3. The apparatus as defined in claim 1, wherein:

said cooling tube is a stainless steel tube covered on an inner surface thereof with a water-repellent layer for said inner layer.

4. The apparatus as defined in claim 2, wherein:

said beverage liquid tube is a plastic synthetic resin tube covered on an inner surface thereof with a water-repellent layer for said inner layer.

5. The apparatus as defined in claim 3, wherein:

said water-repellent layer is formed in accordance with gelatinizing process of colloidal solution of a glass material.

6. The apparatus as defined in claim 5, wherein:

said glass material is tetraethoxylane.

7. The apparatus as defined in claim 3, wherein:

said water-repellent layer has a thickness of 10 to 100 nm.

8. The apparatus as defined in claim 3, wherein:

said stainless steel tube is a coiled tube.

9. The apparatus as defined in claim 4, wherein:

said water-repellent layer is of polytetrafluoroethylene.

10. The apparatus as defined in claim 2, wherein:

said beverage liquid tube is transparent.

11. A beverage supply apparatus, comprising:

a tank for containing thick beverage liquid;

a cistern for containing water to dilute said thick beverage liquid;

a first nozzle for spouting said thick beverage liquid to a cup;

a second nozzle for spouting said water to said cup;

a thick beverage liquid tube having said first nozzle at one end thereof and connected to said tank at an opposite end thereof;

a water tube having said second nozzle at one end thereof and connected to said cistern at an opposite end thereof;

a thick beverage liquid-cooling tube interposed at an appropriate position of said thick beverage liquid tube;

a water-cooling tube interposed at an appropriate position of said water tube;

a cooling medium for immersing said thick beverage liquid and water-cooling tubes; and first and second supply valves for controlling said first and second nozzles to spout said thick beverage liquid and said water to said cup;

wherein each of said thick beverage liquid-and water-cooling tubes has an inner layer for preventing inorganic minerals such as Ca, Mg, etc. from depositing thereon, and each of said thick beverage liquid and water tubes has an inner layer for preventing said inorganic minerals thereon on a side of a down-stream of each of said thick beverage liquid-and water-cooling tubes.

12. The apparatus as defined in claim 11, wherein:

each of said thick beverage liquid and water tubes has an inner layer for preventing said inorganic minerals from depositing thereon on a side of an up-stream of each of said thick beverage liquid-and water-cooling tubes.

13. The apparatus as defined in claim 11, wherein:

each of said thick beverage liquid-and water-cooling tubes is a stainless steel tube covered on an inner surface thereof with a water-repellent layer for said inner layer.

14. The apparatus as defined in claim 12, wherein:

each of said thick beverage liquid and water tubes is a plastic synthetic resin tube covered on an inner surface thereof with a water-repellent layer for said inner layer.

15. The apparatus as defined in claim 13, wherein:

said water-repellent layer is formed in accordance with gelatinizing process of colloidal solution of a glass material.

16. The apparatus as defined in claim 15, wherein:

said glass material is tetraethoxylane.

17. The apparatus as defined in claim 13, wherein:

said water-repellent layer has a thickness of 10 to 1000 nm.

18. The apparatus as defined in claim 13, wherein:

said stainless steel tube is a coiled tube.

19. The apparatus as defined in claim 14, wherein:

said water-repellent layer is of polytetrafluoroethylene.

20. The apparatus as defined in claim 14, wherein:

each of said thick beverage liquid and water tubes is transparent.

* * * * *